United States Patent [19]

Matsuoka

[11] Patent Number: 5,781,366
[45] Date of Patent: Jul. 14, 1998

[54] TAPE LOADING DEVICE

[75] Inventor: Hidetoshi Matsuoka, Tokyo, Japan

[73] Assignee: Cannon Kabushiki Kaisha, Tokyo, Japan

[21] Appl. No.: 753,256

[22] Filed: Nov. 21, 1996

Related U.S. Application Data

[63] Continuation of Ser. No. 341,446, Nov. 16, 1994, abandoned, which is a continuation of Ser. No. 827,288, Jan. 29, 1992, abandoned.

[30] Foreign Application Priority Data

Feb. 8, 1991 [JP] Japan ................................. 3-017504
Mar. 11, 1991 [JP] Japan ................................. 3-044878

[51] Int. Cl.$^6$ ................................................ G11B 5/027
[52] U.S. Cl. ................................................ 360/85
[58] Field of Search .................................. 360/84, 85, 95

[56] References Cited

U.S. PATENT DOCUMENTS

| | | | |
|---|---|---|---|
| 5,168,399 | 12/1992 | Kano et al. ........................... | 360/85 |
| 5,363,257 | 11/1994 | Matsuoka ............................. | 360/85 |
| 5,365,386 | 11/1994 | Konishi et al. ...................... | 360/85 |
| 5,546,249 | 8/1996 | Konishi et al. ...................... | 360/85 |
| 5,550,686 | 8/1996 | Matsuoka et al. ................... | 360/85 |
| 5,659,439 | 8/1997 | Matsuoka ............................. | 360/85 |

*Primary Examiner*—Allen Cao
*Attorney, Agent, or Firm*—Robin, Blecker & Daley

[57] ABSTRACT

In a tape loading device for wrapping a tape member around a rotary drum to a given degree of angle by moving two guide posts in opposite directions along the rotary drum, a plurality of rail defining members define rail slots which are arranged to individually guide the two guide posts, and two joints between the rail defining members on both sides of each of the rail slots are disposed in positions deviating from each other to a distance which is longer than the length of the guide post in the longitudinal direction of the rail slot.

21 Claims, 4 Drawing Sheets

TAPE LOADING DEVICE

This is a continuation of application Ser. No. 08/341,446, filed on Nov. 16, 1994 which is a continuation of application Ser. No. 07/827,288, filed Jan. 29, 1992, both now abandoned.

BACKGROUND OF THE INVENTION

1. Field of the Invention

This invention relates to a tape loading device and more particularly to a device for wrapping a magnetic tape a given degree of angle around the circumferential surface of a rotary drum, for example, in a helical scanning type magnetic recording and reproducing apparatus using the magnetic tape as a recording medium.

2. Description of the Related Art

The helical scanning type magnetic recording and reproducing apparatus such as a video tape recorder (VTR) or a digital audio tape recorder (DAT) is provided with a tape loading device. When the apparatus is loaded with a tape cassette, the tape loading device pulls a magnetic tape out from the tape cassette and wraps the magnetic tape around the outer circumferential surface of a rotary drum to a given degree of angle. In the case of an 8-mm type apparatus, for example, the rotary drum is arranged to have a small diameter and, therefore, the wrapping angle of the magnetic tape around the rotary drum increases. The wrapping angle must be at a given constant value. To meet this requirement, the tape loading device is provided with rail slots for guiding, along the rotary drum, guide posts (or guide rollers) which are arranged to pull the magnetic tape out from the tape cassette and to keep the magnetic tape in the state of being wrapped a given degree of angle around the rotary drum. The tape loading device also includes a holding mechanism which is arranged to hold the guide posts at the ends of the rail slots.

In the case of a typical example of the conventional tape loading device, almost the whole of each of the rail slots is formed by a guide rail which is molded with a plastic material. The end part of the rail slot is formed on a drum base which is made of an aluminum die-cast material. The guide rails permit reduction in weight while the end parts permit accurate positioning of the guide posts. In other words, in the example of the conventional device, each of the guide-post guiding rail slots substantially consists of two parts, one being formed by the guide rail and the other by the drum base.

In the conventional device which is arranged in the above-stated manner, the rail slot has joint parts in the paths of the guide posts. Therefore, a stepped difference in level would appear in each of the paths if two parts of the rail slot are not accurately positioned. Even if the two parts of the rail slot are accurately positioned at the time of assembly work, deformation of the guide rail which is made of a plastic material or positional deviation of the screws used for fixing the guide rail would bring about some stepped level difference in the paths. If the stepped level difference is excessive, it would prevent the smooth movement of the guide posts and cause jumping or irregular movement of the guide posts. The irregular movement of the guide posts then causes fluctuations in the tape wrapping position (height, for example) of the magnetic tape relative to the rotary drum and might result in unstable recording and reproduction characteristics. Further, the above-stated behavior tends to damage the magnetic tape to cause noises such as a dropout in a reproduced image or the like.

SUMMARY OF THE INVENTION

This invention is directed to the solution of the above-stated problem. It is, therefore, a first object of the invention to provide a tape loading device which is capable of smoothly moving the guide posts even if the guide-post guiding rail slots have stepped level differences at the joint parts thereof.

It is a second object of the invention to provide a tape loading device which is arranged not only to attain the above-stated first object but also to facilitate manufacturing and assembling work thereon.

It is a third object of the invention to provide a tape loading device which is capable of preventing the positional deviation of the tape relative to the rotary drum from being caused by the behavior of the guide posts such as jumping or the like and which is capable of preventing the tape from being damaged as a result of the guide posts' behavior.

To attain these objects, a tape loading device which is arranged according to this invention to wrap a tape member a given degree of angle around a rotary drum by moving two guide posts in opposite directions along the rotary drum is characterized in that in the tape loading device, a plurality of rail defining members are arranged to define the edge parts of rail slots which are arranged to individually guide the two guide posts; and two joints between adjacent ones of the plurality of adjacent rail defining members are arranged to deviate from each other at least a given distance in the longitudinal direction of the rail slots. The two joints which are located on both sides of each of the rail slots are preferably separated from each other to a distance which is longer than the length of the guide post as measured in the longitudinal direction of the rail slot.

The above-stated arrangement of the two joints of the rail slots effectively prevents the guided guide posts from coming in touch simultaneously with the two joints on both sides of each rail slot. The invented arrangement thus enables the guide posts to smoothly move along the rail slots even if the manufacturing and assembling precision of the device is allowed to have a certain amount of tolerance.

A tape loading device which is arranged as another embodiment of this invention to wrap a tape member a given degree of angle around a rotary drum by moving two guide posts in opposite directions along the rotary drum is characterized in that the edge parts of rail slots which are arranged to individually guide the two guide posts are defined by a plurality of rail defining members; and a stepped level difference is provided in a given direction at a connection part (or joint) between adjacent ones of the plurality of rail defining members.

The stepped level difference is provided in the given direction according to the direction of exerting a driving force on the guide post at the connection part between the adjacent rail defining members defining the edge parts of the rail slots which guide the guide posts. The stepped level difference is thus arranged to enable the guide post to be smoothly moved without any irregular behavior, such as jumping or the like, at the connection part between the adjacent rail defining members, so that the tape position in the direction of tape width can be stably kept.

The above and other objects and features of the invention will become apparent from the following detailed description of embodiments thereof taken in conjunction with the accompanying drawings.

DETAILED DESCRIPTION OF THE PREFERRED EMBODIMENTS

The following describes by way of example an embodiment of this invention with reference to the drawings. In the case of this embodiment, the invention is applied to the tape loading device of an 8-mm type VTR. The whole arrangement of the device will be described first. After that, the parts of the embodiment which are characteristic of the embodiment will be described.

Figure 1:
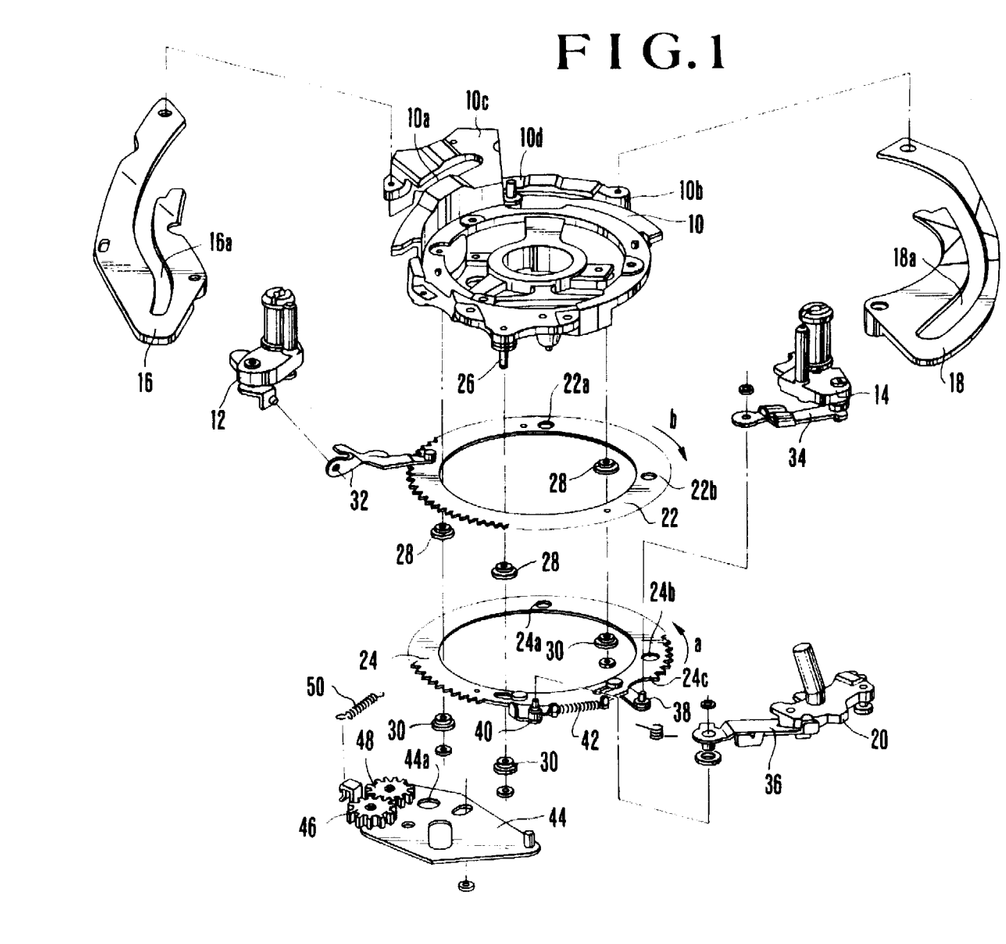
FIG. 1 is an exploded oblique view showing a tape loading device which is arranged as an embodiment of the invention.

FIG. 1 shows in an exploded oblique view the tape loading device of the 8-mm type VTR embodying this invention. Referring to FIG. 1, an aluminum die-cast drum base 10 is arranged to carry a rotary drum which is not shown. Guide posts 12 and 14 are arranged to pull a magnetic tape (not shown) out of a tape cassette and to wrap the tape a given degree of angle around the rotary drum. The drum base 10 includes rail slots 10a and 10b which are arranged to guide the guide posts 12 and 14 to given positions where the magnetic tape is wrapped a given degree of angle around the rotary drum; and lock members 10c and 10d, such as hooks, which are arranged to lock the guide posts 12 and 14 at the end parts of the rail slots 10a and 10b. The lock member 10d which is provided for the guide post 14 is formed in a position deeper than the position of the lock member 10c which is provided for the guide post 12 with respect to the circumferential direction of the rotary drum.

Guide rails 16 and 18 are formed by molding a plastic resin material. The guide rails 16 and 18 respectively form rail slots 16a and 18a, which are curved according to the desired loci of the guide posts 12 and 14. These guide rails 16 and 18 are screwed respectively to the drum base 10 in such a way as to make them continuous to the rail slots 10a and 10b of the drum base 10.

In the case of an 8-mm type VTR, the magnetic tape is wrapped at a large wrap angle around a rotary drum which has a small diameter and the traveling path of the tape must be curved to a great degree accordingly. To meet this requirement, the tape loading device of the 8-mm type VTR is provided with an additional guide post 20. The guide post 20 is arranged to move while being guided along the outer circumferential surface of the guide rail 18 at the time of tape loading.

Two loading rings 22 and 24 which have toothed parts formed along their peripheries are arranged in a laminated state below the drum base 10. The inner diameters of these rings 22 and 24 are equal to each other. However, the outer diameter of the ring 24 is arranged to be larger than that of the ring 22. Three pins 26 extend downward from the drum base 10. A roller 28 which is arranged to come into sliding contact with the inner side of the ring 22 is rotatably mounted on each of the pins 26. A roller 30 which is arranged to come into sliding contact with the inner side of the other ring 24 is rotatably mounted on each of the pins 26.

This arrangement enables the rings 22 and 24 to freely rotate on the axis of the drum base 10.

The guide post 12 is mounted on the ring 22 through an arm 32. The guide posts 14 and 20 are mounted on the ring 24 respectively through arms 34 and 36 and shafts 38 and 40. The ring 22 and the arm 32 are rotatably connected. The arm 32 and the guide post 12 are rotatably connected. The arm 34 and the shaft 38 are rotatably connected. The arm 36 and the shaft 40 are rotatably connected. The arms 34 and 36 are rotatably connected respectively to the guide posts 14 and 20. The shafts 38 and 40 are inserted in narrow oblong openings provided in the ring 24 and are thus mounted to be movable to a given distance along the circumference of the ring 24. A spring 42 is arranged to constantly urge both the shafts 38 and 40 to move counterclockwise.

On a gear plate 44 are mounted two mutually engaging gears 46 and 48. The gear 46 engages the peripheral teeth of the ring 24. The other gear 48 engages the peripheral teeth of the ring 22. The gear 48 is thinner than the gear 46. The gear plate 44 is mounted on a stationary member such as a chassis, which is not shown, in such a way as to be rotatable on the center of rotation of the rings 22 and 24. A spring 50 urges the gear plate 44 to move clockwise. Further, in order to have the gear 48 not come in touch with the ring 24 in mounting the gear plate 44, the ring 24 is provided with a cutout 24c in a part where contact with the gear 48 is avoidable.

A rotary drum which is not shown is mounted on the drum base 10 with screws. For this purpose, mounting screw holes are provided in the drum base 10. In addition to these holes, the drum base 10 is provided further with screw holes 22a, 22b, 24a, 24b and 44a in such positions that correspond to the rotation phases of the rings 22 and 24 and to the gear plate 44 for the purpose of mounting and demounting work to be carried out on the rotary drum 10 by means of the mounting screws.

Figure 2:
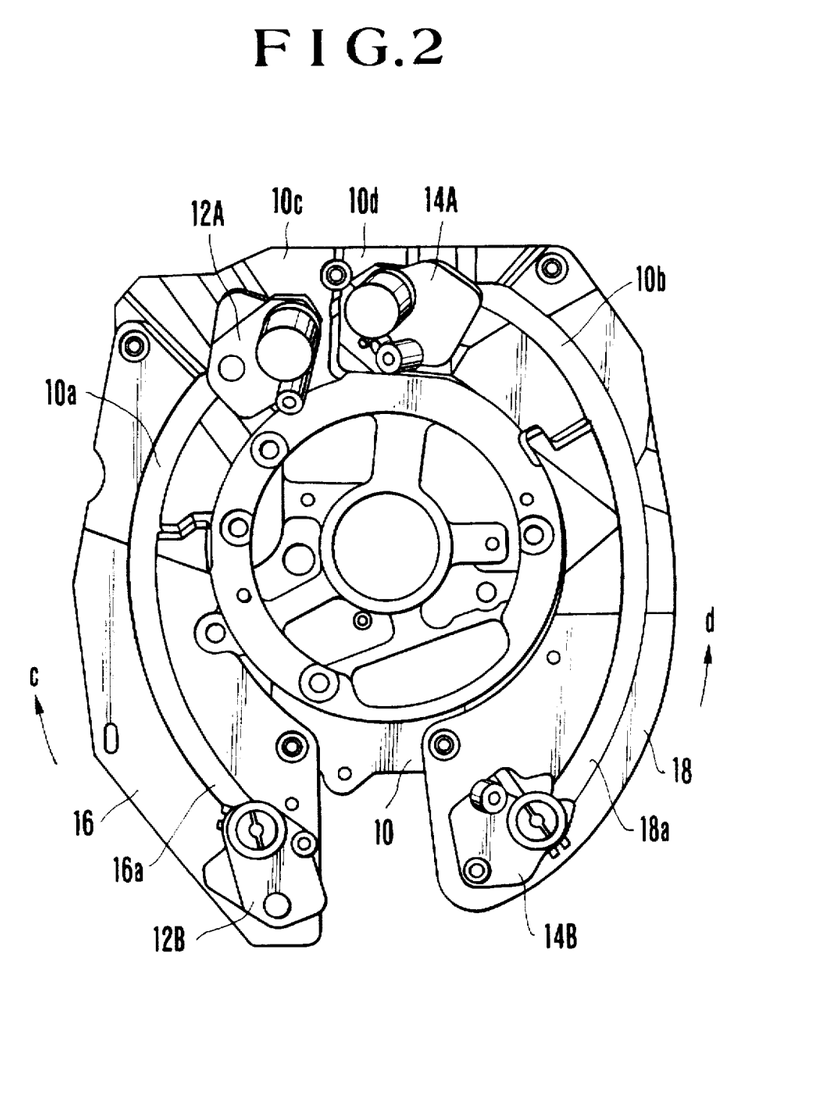
FIG. 2 is a plan view showing the tape loading device of FIG. 1 in an assembled state.

FIG. 2 shows in a plan view the component parts shown in FIG. 1 in an assembled state. In FIG. 2, reference numerals 12A and 14A denote the positions of the guide posts 12 and 14 obtained after completion of a tape loading action. Reference numerals 12B and 14B denote the positions of the guide posts 12 and 14 obtained after completion of a tape unloading action.

In brief, the tape loading action is performed as follows: the ring 24 is caused to rotate counterclockwise as indicated with an arrow "a" by a loading motor which is not shown. The torque of this rotation is transmitted via the gears 46 and 48 to the ring 22. The ring 22 then rotates clockwise as indicated by an arrow "b". In response to the rotation of the rings 22 and 24, the guide posts 12 and 14 respectively move from the positions 12B and 14B along the rail slots 16a and 18a of the guide rails 16 and 18 and further along the rail slots 10a and 10b of the drum base 10 as indicated by arrows "c" and "d".

Upon arrival at the positions 12A and 14A as shown in FIG. 2, the guide posts 12 and 14 respectively abut on the lock members 10c and 10d. When the ring 24 rotates further counterclockwise, the spring 42 stretches out as the guide post 14 is no longer movable. The guide post 14 is then pushed by the resilience of the spring 42 against the lock member 10d to be kept immovable there. Since the guide post 12 is likewise kept immovable any further by the lock member 10c, the ring 22 is stopped from rotating. The rotating torque of the ring 24 rotates the gears 46 and 48 to cause the gear plate 44 to turn (revolve) counterclockwise around the rings 22 and 24. The revolution of the gear plate 44 stretches the spring 50. The resilience of the spring 50 then urges the ring 22 clockwise. The guide post 12 is thus pushed against the lock member 10c to be kept in an immovable state there.

In the case of unloading the magnetic tape from the rotary drum, the tape loading device acts in the reverse order of processes. In this case, the guide posts 12 and 14 move from the positions 12A and 14A to the positions 12B and 14B as shown in FIG. 2.

Figure 3A:
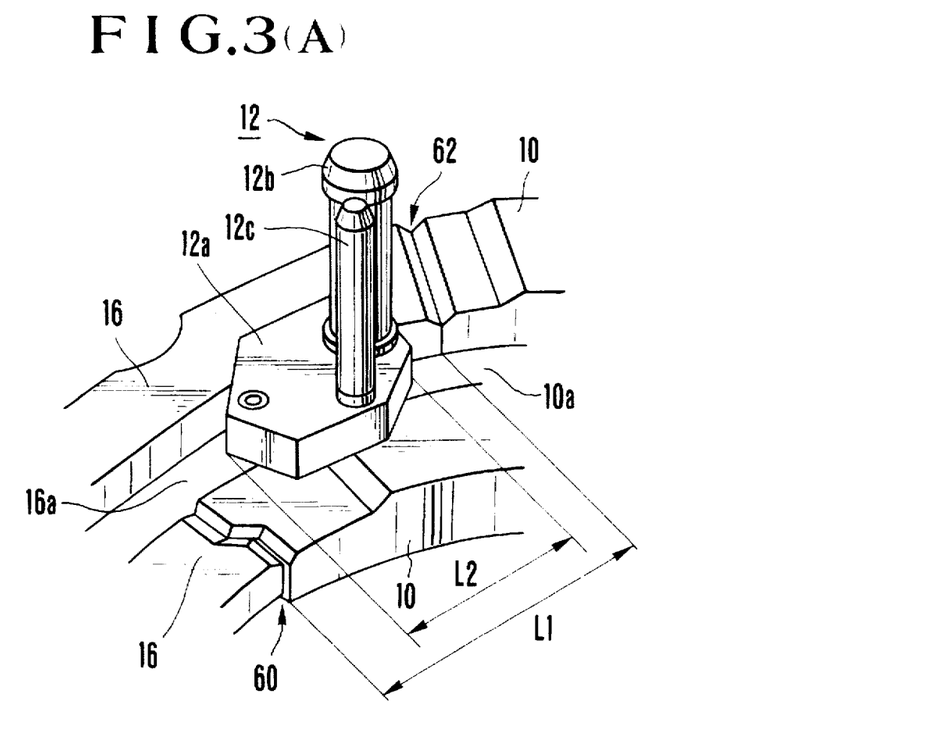
FIGS. 3(A) and 3(B) are oblique views showing the characteristic parts of the embodiment of the invention, FIG. 3(A) showing the relations of a guide post 12, a guide rail 16 and a drum base 10 and FIG. 3(B) showing the relations of a guide post 14, a guide rail 18 and the drum base 10.
Figure 3B:
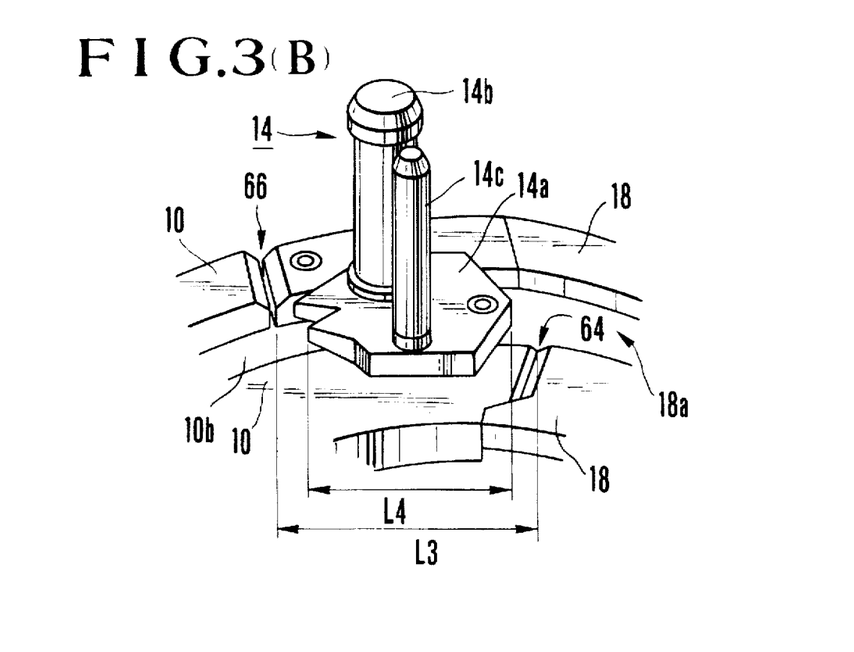

Parts characteristic of this embodiment are described as follows: FIGS. 3(A) and 3(B) show in oblique views the characteristic parts of the embodiment. Of these drawings, FIG. 3(A) shows joint parts between the rail slots 16a and 10a in relation to the guide post 12. FIG. 3(B) shows joint parts between the rail slots 18a and 10b in relation to the guide post 14. The guide post 12 is formed by erecting two posts 12b and 12c on a base 12a, and the guide post 14 is formed by erecting two posts 14b and 14c on a base 14a. The base 12a is wider than the width of each of the rail slots 16a and 10a, while the base 14a is wider than the width of each of the rail slots 18a and 10b. The bases 12a and 14a are thus arranged to be guided respectively along the rail slots 16a and 10a and along the rail slots 18a and 10b in a state of riding on the guide rail 16 and the drum base 10 and on the guide rail 18 and the drum base 10.

In FIG. 3(A), reference numerals 60 and 62 denote joints between the guide rail 16 (or the rail slot 16a) and the drum base 10 (or the rail slot 10a). In FIG. 3(B), reference numerals 64 and 66 denote joints between the guide rail 18 (or the rail slot 18a) and the drum base 10 (or the rail slot 10b). As shown, in the case of this embodiment, the joints 60 and 62 between the guide rail 16 and the drum base 10 are disposed in positions which deviate from each other in the longitudinal direction of the rail slots 16a and 10a. The joints 64 and 66 between the guide rail 18 and the drum base 10 are also disposed in positions deviating from each other in the longitudinal direction of the rail slots 18a and 10b. Meanwhile, a distance L1 between the joints 60 and 62 is arranged to be longer than the length L2 of the base 12a of the guide post 12. A distance L3 between the joints 64 and 66 is also arranged to be longer than the length L4 of the base 14a of the guide post 14.

With the embodiment arranged in this manner, even if there are stepped level differences at the joint 60, 62, 64 or 66, the base 12a or 14a of the guide post 12 or 14 never comes in touch simultaneously with two stepped level differences which might exist on both sides of the rail slots while the guide post 12 or 14 is moving along the rail slots 16a and 10a or 18a and 10b.

As apparent from the foregoing description, the embodiment is arranged to be capable of smoothly moving the guide posts even if there are stepped level differences at the joints between the guide-post guiding rail slots. Therefore, the invented arrangement facilitates the manufacturing and assembly processes as the tolerance allowable to the parts does not have to be more severe than a certain tolerance limit.

Figure 4A:
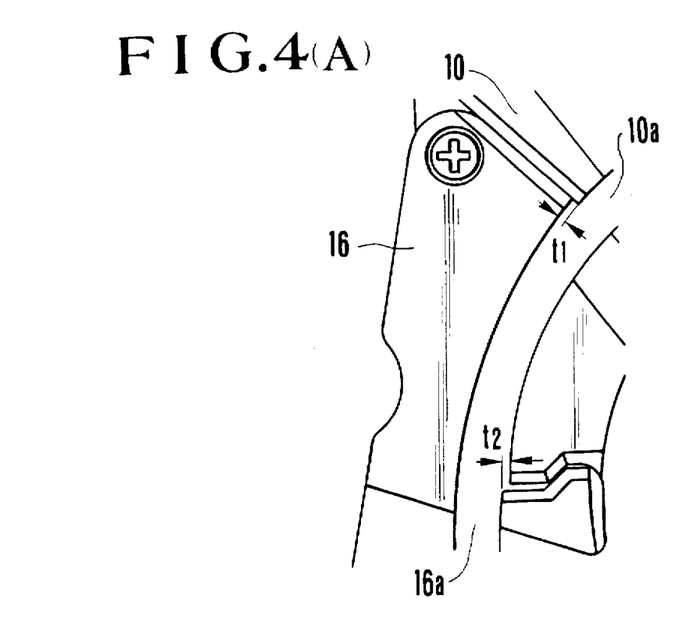
FIGS. 4(A) and 4(B) are enlarged plan views showing the characteristic parts of another embodiment of the invention, FIG. 4(A) showing a connecting relation between a guide rail 16 and a drum base 10 and FIG. 4(B) showing a connecting relation between a guide rail 18 and the drum base 10.
Figure 4B:
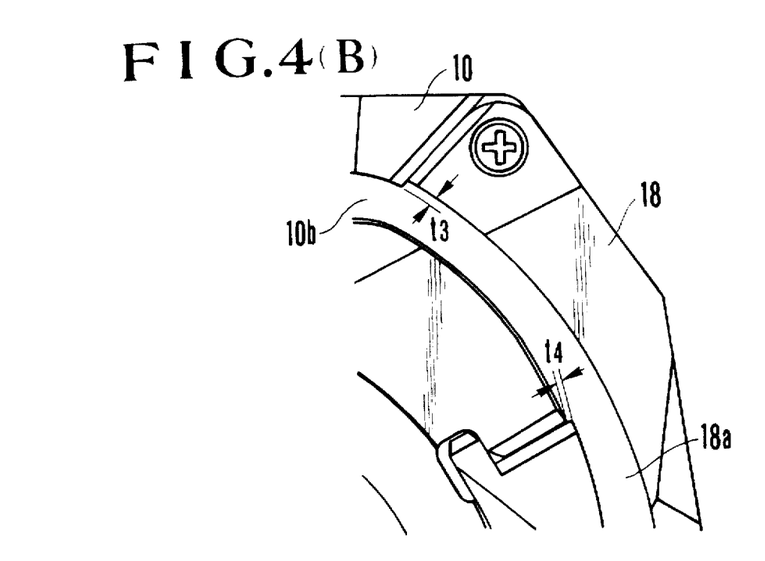

While the object of the invention is attainable by the embodiment described, the advantageous effect of the invention can be furthered by an additional arrangement included in a second embodiment described below:

The second embodiment is arranged as shown in FIGS. 4(A) and 4(B), which show in enlarged plan views the characteristic parts of the embodiment. FIG. 4(A) is an enlarged view of a connection part between the rail slot 16a of the guide rail 16 and the rail slot 10a of the drum base 10.

FIG. 4(B) is an enlarged view of a connection part between the rail slot 18a of the guide rail 18 and the rail slot 10b of the drum base 10. The illustration is exaggerated in part for easier comprehension. In this case, the position of the rail slot 16a of the guide rail 16 provided for the guide post 12 is arranged to somewhat deviate outward from the rail slot 10a of the drum base 10, by a distance t1 on the outer side and by a distance t2 on the inner side, on both the outer and inner sides of the rail slots 16a and 10a. The rail slot 18a of the guide rail 18 provided for the guide post 14 is likewise arranged to somewhat deviate outward from the rail slot 10b of the drum base 10, by a distance t3 on the outer side and by a distance t4 on the inner side, on both the outer and inner sides of the rail slots 18a and 10b. These distances of deviation may be arranged to be t1=t2 and t3=t4.

As apparent from the tape loading action of the first embodiment described in the foregoing, the guide posts 12 and 14 are operated through the arms 32 and 34 which are connected to the rings 22 and 24. In loading the tape, therefore, forces are exerted on the guide posts 12 and 14 in the inward directions of the rail slots 16a, 18a, 10a and 10b. The guide posts 12 and 14, therefore, move along the inner sides of the rail slots 16a and 18a of the guide rails 16 and 18 and the rail slots 10a and 10b of the drum base 10. With the rail slot 16a or 18a of the guide rail 16 or 18 disposed in a position a little deviating outward from the rail slot 10a or 10b of the drum base 10 in the case of the embodiment, the guide post 12 or 14 is allowed to move inward descending as much as a stepped level difference t2 or t4 between the rail slot 16a or 18a and the rail slot 10a or 10b in the process of moving from the rail slot 16a or 18a to the rail slot 10a or 10b. Therefore, the guide posts 12 and 14 can be smoothly moved.

In unloading the tape, moving forces are exerted outward and not inward on the guide posts 12 and 14. The guide posts 12 and 14, therefore, move along the outer sides of the rail slots 16a and 18a of the guide rails 16 and 18 and the rail slots 10a and 10b of the drum base 10. In the process of moving from the rail slot 10a or 10b of the drum base 10 to the rail slot 16a or 18a of the guide rail 16 or 18, therefore, the guide post 12 or 14 moves outward descending as much as a stepped level difference t1 or t3 between the rail slot 10a or 10b and the rail slot 16a or 18a. Therefore, the guide posts 12 and 14 can be smoothly moved.

In cases where the guide posts 12 and 14 are arranged, unlike the embodiment described above, to be moved in sliding contact respectively with the outer edges of the rail slots 16a and 10a and those of the rail slots 18a and 10b in loading the tape and in sliding contact with the inner edges of the rail slots 16a and 10a and those of the rail slots 18a and 10b in unloading the tape, the rail slots 16a and 18a are arranged in positions a little deviating from the rail slots 10a and 10b toward the center of rotation of the rings 22 and 24.

As mentioned in the foregoing, the advantageous effect of the invention can be enhanced by a combination of the two embodiments described. However, the guide posts can be smoothly moved within the rail slots with each of the embodiments singly put into practice. In accordance with this invention, therefore, the tape position relative to the rotary drum can be prevented from deviating due to jumping or some irregular movement of the guide posts and the tape can be prevented from being damaged by such irregular movement of the guide posts.

While the embodiments described are arranged to move the guide posts by means of the loading rings 22 and 24, this invention is of course applicable to tape loading devices of different kinds, such as a device having a link type loading mechanism or a rail docking type device.

What is claimed is:

1. A tape loading device for wrapping a tape around a rotary drum to a given degree of angle, comprising:
   a) a guide member moved in a direction along the rotary drum for wrapping the tape around the rotary drum to the given degree of angle; and
   b) a plurality of rail defining members for defining edge parts of a rail slot which is guided said guide member, said plurality of rail defining members including first, second, third and fourth rail defining members, the first and second rail defining members adjacent to one another and forming one edge part of the rail slot guiding said guide member in loading the tape, the third and fourth rail defining members adjacent to one another and forming another edge part of the rail slot guiding said guide member in unloading the tape, the first rail defining member being opposite to the third rail defining member, the second rail defining member being opposite to the fourth rail defining member, a plurality of joints formed between the respective adjacent rail defining members of said plurality of rail defining members, each joint being provided with a stepped level difference corresponding to the direction in which a force acting on said guide member is exerted,
   said guide member sliding by contact with the one edge part of the rail slot in loading the tape and said guide member sliding by contact with the another edge part of the rail slot in unloading the tape, the edge part of the first rail defining member being shifted to the edge part of the second rail defining member, the edge part of the third rail defining member being shifted to the edge part of the fourth rail defining member in the same direction relative to the direction where the edge part of the first rail defining member is being shifted to the edge part of the second rail defining member.

2. A device according to claim 1, wherein said force acting on said guide member is exerted in the direction of the inner side of the rail slot in loading the tape and in the direction of the outer side of the rail slot in unloading the tape.

3. A device according to claim 1, wherein said force acting on said guide member is exerted in the direction of the outer side of the rail slot in loading the tape and in the direction of the inner side of the rail slot in unloading the tape.

4. A device according to claim 1, wherein said rotary drum is provided with information converting means and is arranged to record or reproduce information on or from the tape.

5. A device according to claim 4, wherein said tape is a magnetic tape.

6. A device according to claim 5, wherein said information converting means is a magnetic head.

7. A device according to claim 1, wherein said guide member is erected on a movable member.

8. A device according to claim 7, wherein said guide member is rotatable.

9. A device according to claim 1, wherein ends of the first and third rail defining members are connected.

10. A device according to claim 9, wherein ends of the second and fourth rail defining members are connected.

11. A recording or reproducing apparatus for recording or reproducing information on or from a tape-shaped recording medium by wrapping the tape-shaped recording medium around a rotary drum which is provided with at least a head, comprising:
   a) a chassis;
   b) a drum base secured to said chassis and supporting the rotary drum;
   c) a guide member moved in a direction along the rotary drum for wrapping the tape-shaped recording medium to a given degree of angle around the rotary drum; and
   d) a plurality of rail defining members disposed adjacent to said drum base and defining, in conjunction with said drum base, edge parts of a rail slot for guiding said guide member, said plurality of rail defining members including first, second, third and fourth rail defining members, the first and second rail defining members adjacent to one another and forming one edge part of the rail slot guiding said guide member in loading the tape, the third and fourth rail defining members adjacent to one another and forming another edge part of the rail slot, guiding said guide member in unloading the tape, the first rail defining member being opposite to the third rail defining member, the second rail defining member being opposite to the fourth rail defining member, a plurality of joints formed between said drum base and said rail defining member, each joint being provided with a stepped level difference corresponding to the direction in which a force acting on said guide member is exerted,
   said guide member sliding by contact with the one edge part of the rail slot in loading the tap and said guide member sliding by contact with the another edge part of the rail slot in unloading the tape, the edge part of the first rail defining member being shifted to the edge part of the second rail defining member, the edge part of the third rail defining member being shifted to the edge part of the fourth rail defining member in the same direction relative to the direction where the edge part of the first rail defining member is being shifted to the edge part of the second rail defining member.

12. An apparatus according to claim 11, wherein said force acting on said guide member is exerted in the direction of the inner side of the rail slot in loading the tape-shaped recording medium and in the direction of the outer side of the rail slot in unloading the tape-shaped recording medium.

13. An apparatus according to claim 11, wherein said force acting on said guide member is exerted in the direction of the outer side of the rail slot in loading the tape-shaped recording medium and in the direction of the inner side of the rail slot in unloading the tape-shaped recording medium.

14. An apparatus according to claim 11, wherein said rail defining member is formed by molding.

15. An apparatus according to claim 11, wherein said rail slot is composed of a slot formed by said rail defining member, a slot formed by said drum base and a slot formed jointly by said rail defining member and said drum base.

16. An apparatus according to claim 15, wherein the slot width of the slot formed jointly by said rail defining member and said drum base is wider than that of the slot formed by said rail defining member and that of the slot formed by said drum base.

17. An apparatus according to claim 11, wherein ends of the first and third rail defining members are connected.

18. An apparatus according to claim 17, wherein ends of the second and fourth rail defining members are connected.

19. A tape loading device for wrapping a tape around a rotary drum to a predetermined degree of angle, comprising:
   a) a guide member moved in a direction along the rotary drum for wrapping the tape around the rotary drum to the predetermined degree of angle, and b) a plurality of rail defining members for defining edge parts of a rail slot which is guided said guide member, said plurality of rail defining members including first, second, third and fourth rail defining members, the first and second rail defining members adjacent to one another and forming one edge part of the rail slot for guiding said guide member in loading the tape, the third and fourth rail defining members adjacent to one another and forming another edge part of the rail slot for guiding said guide member in unloading the tape, the first railing defining member being opposite to the third rail defining member, the second rail defining member being opposite to the fourth rail defining member, in which said second and fourth rail defining members being shifted relatively to said first and third rail defining members widthwise and in a same direction, said guide member sliding by contact with the one edge part of the rail slot in loading the tape and said guide member sliding by contact with the another edge part of the rail slot in unloading the tape, the edge part of first rail defining member being shifted to the edge part of the first rail defining member, the edge part of the third rail defining member being shifted to the edge part of the fourth rail defining member in the same direction relative to the direction where the edge part of the first rail defining member is being shifted to the edge part of the second rail defining member.

20. A device according to claim 19, wherein ends of the first and third rail defining members are connected.

21. A device according to claim 20, wherein ends of the second and fourth rail defining members are connected.

* * * * *

UNITED STATES PATENT AND TRADEMARK OFFICE
CERTIFICATE OF CORRECTION

PATENT NO. : 5,781,366
DATED : July 14, 1998
INVENTOR(S) : Hidetoshi Matsuoka

It is certified that error appears in the above-identified patent and that said Letters Patent is hereby corrected as shown below:

Col. 8, line 28, delete "tap" and insert --tape--.

Signed and Sealed this

Fourth Day of May, 1999

Attest:

Q. TODD DICKINSON

*Attesting Officer*   *Acting Commissioner of Patents and Trademarks*